United States Patent [19]

Millard

[11] Patent Number: 4,746,339

[45] Date of Patent: May 24, 1988

[54] FILTERING APPARATUS

[75] Inventor: Robin Millard, Prestbury, England

[73] Assignee: Tilghman Wheelabrator Limited, England

[21] Appl. No.: 22,589

[22] Filed: Mar. 9, 1987

Related U.S. Application Data

[63] Continuation of Ser. No. 762,710, Aug. 5, 1985, abandoned.

[30] Foreign Application Priority Data

| Aug. 6, 1984 | [GB] | United Kingdom | 8419977 |
| Feb. 19, 1985 | [GB] | United Kingdom | 8504267 |
| Feb. 20, 1985 | [GB] | United Kingdom | 8504319 |

[51] Int. Cl.$^4$ .............................................. B01D 46/00
[52] U.S. Cl. ....................................... 55/302; 55/379; 55/381; 55/498; 55/521; 264/273; 425/117; 249/91; 249/93; 210/493.2; 210/493.3
[58] Field of Search ................ 55/381, 378, 379, 302, 55/497–499, 521; 210/333.01, 333.1, 493.1, 493.2, 493.3, 493.4, 493.5; 425/117; 264/273, 257, DIG. 70, DIG. 48; 249/91, 93; 156/218

[56] References Cited

U.S. PATENT DOCUMENTS

| 2,135,863 | 11/1938 | Walker | 55/499 |
| 3,486,626 | 12/1969 | Close | 55/498 |
| 4,007,026 | 2/1977 | Groh | 55/381 |
| 4,187,091 | 2/1980 | Durre et al. | 210/493.1 |
| 4,218,227 | 8/1980 | Frey | 55/499 |
| 4,290,790 | 9/1981 | Okubo | 55/379 |
| 4,511,320 | 4/1985 | Lambertus | 210/493.1 |
| 4,514,875 | 5/1985 | Comer | 55/498 |

FOREIGN PATENT DOCUMENTS

| 2729207 | 1/1978 | Fed. Rep. of Germany | 210/493.2 |
| 2931403 | 3/1980 | Fed. Rep. of Germany | 55/483 |
| 750099 | 6/1956 | United Kingdom | 210/493.2 |
| 1192661 | 5/1970 | United Kingdom . | |
| 1273251 | 5/1972 | United Kingdom . | |
| 1382909 | 2/1975 | United Kingdom . | |

Primary Examiner—Bernard Nozick
Attorney, Agent, or Firm—Jones, Day, Reavis & Pogue

[57] ABSTRACT

A filter comprises a pleated fabric filter bag of generally rectangular configuration within which is removably disposed an internal reinforcing cage of wire or rigid plastics material. The pleated fabric filter bag has an open end and a closed end and at its open end there is moulded integrally with the bag an apertured plastics end cap which has an internal configuration corresponding to the pleated fabric bag. The closed end of the bag is sealed either by the bag material or by an integrally moulded imperforate plastics end cap.

The filter can be disposed vertically or horizontally within the casing of a filtering apparatus and if disposed horizontally it can be stacked in vertical array.

The rectangular pleated fabric filter permits a substantially greater area of filter fabric within a given size of filtering apparatus, casing or housing than has been possible hitherto.

20 Claims, 10 Drawing Sheets

FILTERING APPARATUS

This application is a continuation of application Ser. No. 762,710, filed 8/5/85, now abandoned.

The present invention relates to filtering apparatus, particularly industrial filtering apparatus and the invention is concerned especially with the filters used in such filtering apparatus.

Industrial filtering apparatus is used in many air pollution control situations and in broad terms serves to separate air borne particulate material from air, most or all of the particulate material being retained in the filtering apparatus for collection and eventual discharge with the cleaned air being delivered to atmosphere or an air circulatory system. It is to be understood herein and in the claims that the term "air" is to be construed as including any gaseous medium.

The filters used in industrial filtering apparatus are usually bag filters or cartridge filters.

Bag filters are tubular bags generally of filtering fabric with straight walls and generally of circular or elongate cross-section. In the latter case they tend to be called "pads". Generally speaking they are provided with some form of internal reinforcement to resist collapse during the passage of the air from their exterior to their interior.

The operational life of such filter bags is determined, inter alia, by the surface area of the bag and this operational life can be relatively short depending upon the filtering duties which the filter bag has to perform.

From time to time the filter bags require to be replaced and this is a laborious process in that each filtering bag has a number of securing elements which secure the bag to a cell plate within the filtering apparatus, a filter bag being secured within each cell of the cell plate. Also it is necessary to partially dismantle the filtering apparatus to access the bags, remove them and replace them with fresh filter bags.

A cartridge filter generally comprises two end plates, one apertured the other not. Between these plates is a filtering element which can be pleated and the plates are interconnected by and the filtering element retained in position between inner and outer perforated walls or cages. The disadvantage of cartridge filters is that once their operational life is finished the whole cartridge requires to be replaced, i.e. a cartridge filter is a "throwaway" item. This is expensive to the users of filtering apparatus.

It is an object of the present invention to provide a filter for use in filtering apparatus which obviates or mitigates the aforesaid disadvantages.

According to the present invention, there is provided a filter comprising a pre-pleated fabric filter bag closed at one end and having at its other and open end a moulded apertured plastics end cap.

Preferably, the apertured plastics end cap is moulded integrally with the open end of the pre-pleated fabric filter bag.

Preferably, the filter bag and end cap are of generally rectangular cross-section.

Preferably, the filter bag, in cross-section, has parallel pleated side walls joined by a plain flat wall at one end and by a ridge or triangular configuration wall at the other end.

The filter bag at its closed end may be formed closed or it may be closed by a moulded plastics imperforate plate.

Preferably, the filter comprises an internal reinforcing cage detachably located within the pleated fabric filter bag, which cage extends into each of the pleats of the filter bag and the respective complementary internal groove or recess of the end cap.

Preferably, the internal cage is secured to an apertured cover plate adapted to abut against the moulded apertured plastics end cap of the filter bag.

Embodiments of the present invention will now be described, by way of example, with reference to the accompanying drawings, in which.

Referring to the drawings (see FIGS. 1 to 1B), a pleated fabric filter 30 (see FIG. 17) which can be used instead of conventional bag filters or pad filters or cartridge filters comprises a pleated fabric bag 31 of rectangular configuration integral with an apertured end cap 32 at one end, the end cap 32 being formed of a plastics material, especially but not exclusively a polyurethane, which may, as will be well known to those skilled in the art, include filler agents and pigments to provide required characteristics such, for example, as flexibility, rigidity and time hardening.

The pleated fabric filter bag 31 is formed from a pre-pleated fabric, the fabric being one which is conventionally used in the production of filter bags or pads, and the pleats 33 are locked due to the integration of the fabric material with the plastics flange or end cap 32. The latter, when viewed in plan, has an internal pleated configuration, i.e. a multiplicity of side-by-side grooves or slots 34.

The other end of the pleated filter bag 31 is of closed configuration. It may be closed by forming the fabric itself into a sealed or closed configuration as indicated at 35 (see FIG. 6), or it may be closed by integrating the respective end of the pleated filter bag 31 with an imperforate plastics, for example polyurethane, end cap 36 (see FIG. 7). In this instance, it will be manifest that the fabric pleats 33 are locked both internally or externally due to the imperforate nature of the end cap 36.

The pleated fabric filter bag 31 can be formed in any convenient manner.

A preferred method of manufacture is by sewing or stitching (see FIGS. 2 to 5).

Figures 2, 2A, 3, 3A, 4, 5:
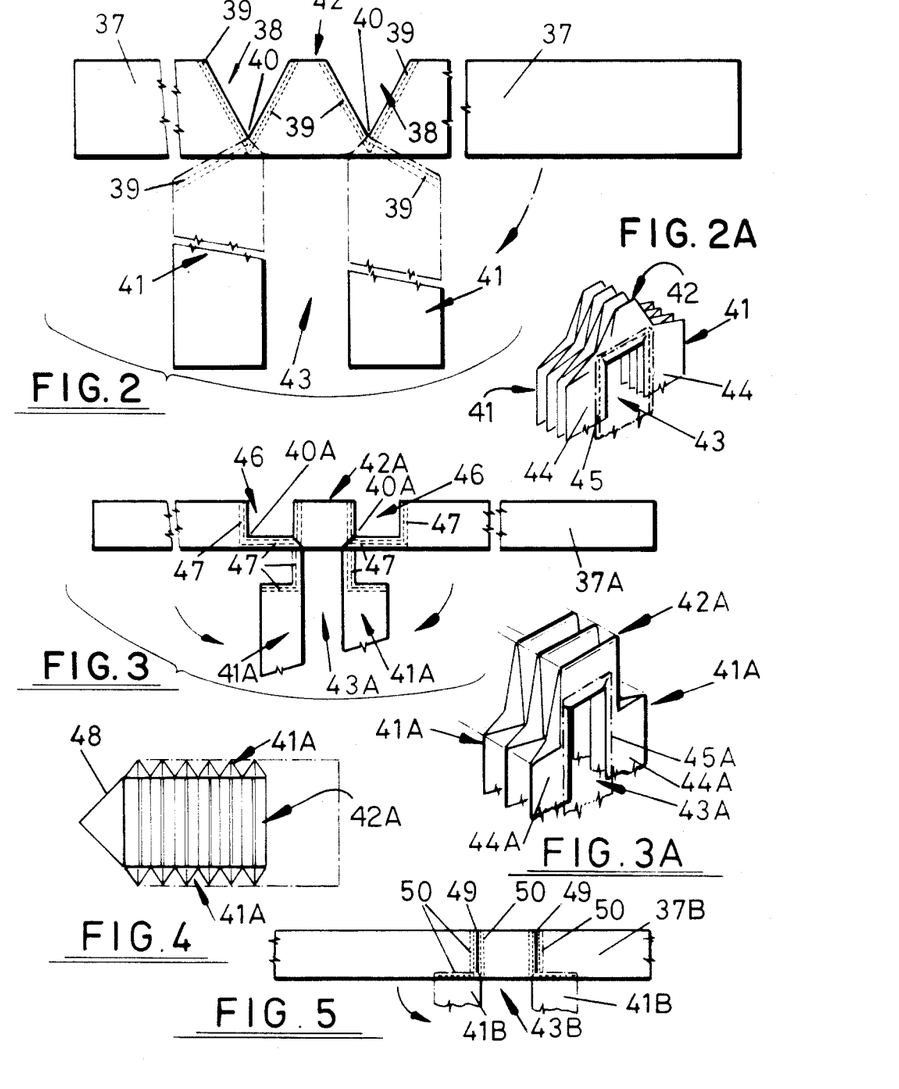
FIG. 2 is a diagrammatic view of a pleated filter bag being formed from a stitching process.
FIG. 2A is a detail view of the formed pleated filtering bag at its closed end.
FIG. 3 is a view corresponding to FIG. 2 showing an alternative mode of stitch forming the pleated filtering bag.
FIG. 3A is a view corresponding to FIG. 2A of the stitch formed pleated filtering bag of FIG. 3 at its closed end.
FIG. 4 is a plan view in diagrammatic form of a pleated filtering bag formed by stitching.
FIG. 5 is a diagrammatic view of yet another method of stitch forming a pleated filter bag.

In FIGS. 2 and 2A, the filtering fabric, for example, is laid out in stacked pleats 37, which may be preformed or simply formed in the stacking, the pleats 37 being of a length more than twice the height of the side walls of the finished pleated filter bag 31.

Two adjacent but spaced V-sections are cut out as indicated at 38 in the middle region of the longitudinal pleats 37 and the cut lines 39 are stitched closed. The portions of the pleats 37 outboard of the cut-outs 38 can then be pivoted around points 40 through 90° to form the pleated side walls 41 of the pleated filter bag 31, the closed end 42 of which is defined by the stitched middle portion. The spaces or gaps 43 in the end walls 44 are closed by strips 45 of filtering fabric which are stitched to the end walls 44.

In FIGS. 3 and 3A, parts corresponding to those of FIGS. 2 and 2A are indicated by the same references with the suffix "A".

However, in this case, rectangular sections 46 are cut out and the lines of stitching are indicated at 47.

In FIG. 4, there is shown a preferred end closure wall 48 stitched to the parallel pleated side walls 41A. This is of triangular or ridge configuration so that if a pleated fabric filter 30 incorporating such a pleated filter bag 31 is used with its open end laterally disposed, the end closure wall 48, is located at the top of the filter 30 (see FIG. 22) thus preventing dust from settling on same which would occur if it were flat.

The other end wall (not shown) may also be of triangular or ridge configuration but generally it will be flat or substantially so similar to end wall 44.

In FIG. 5 where parts similar to those of FIGS. 2 and 2A are designated by the same references with the suffix "B", the pleats 37B are simply cut or split at locations 49 and the parallel cut edges 50 are stitched closed.

The pleated filter bag 31 (see FIGS. 1 to 6A) is therefore of generally rectangular configuration in plan view with a ridged end wall 51, a relatively flat end wall 52, pleated side walls 53, a stitch-closed pleated end 54 and an open end 55 integrated with a plastics apertured end cap 32.

Figures 8, 9:
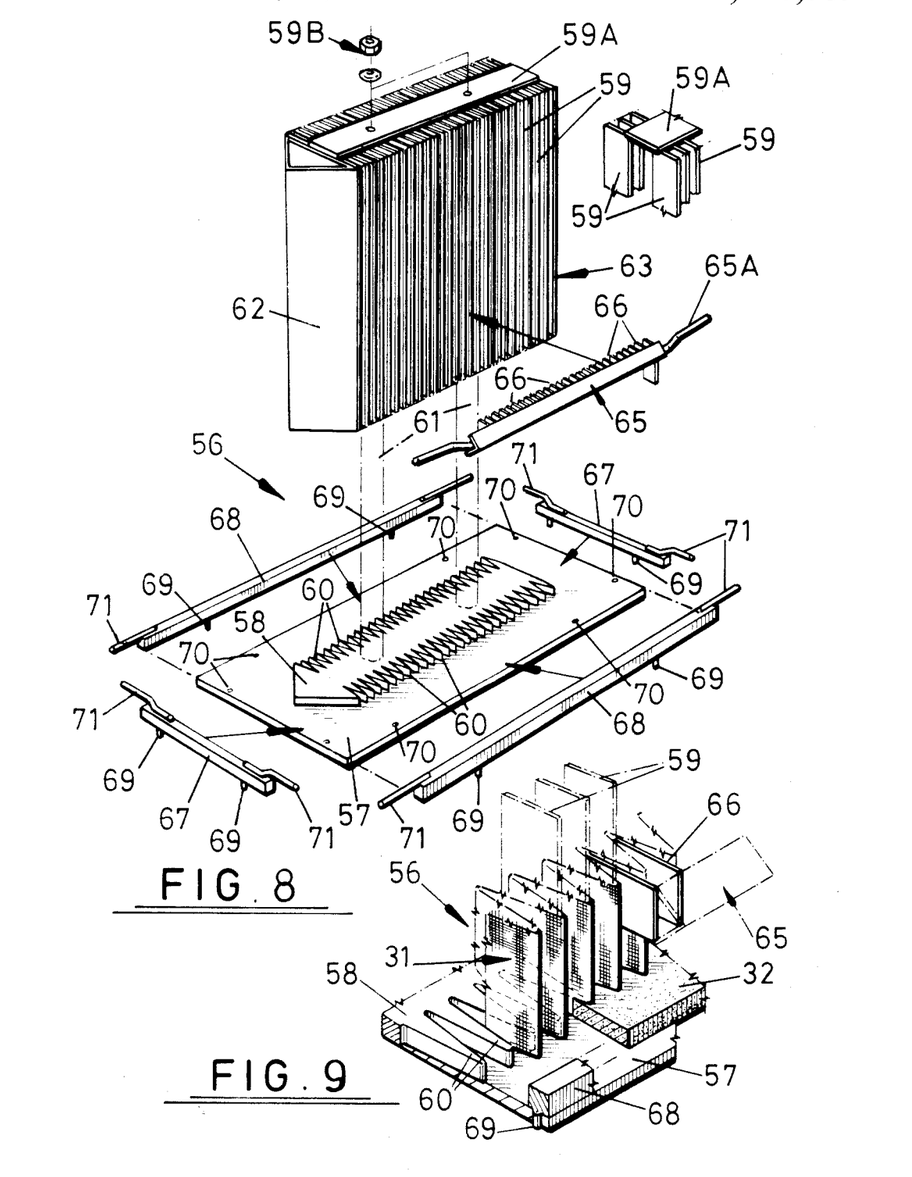
FIG. 8 is an exploded perspective view of a moulding apparatus for forming a pleated filter bag according to the present invention.
FIG. 9 is a perspective detail view of the moulding apparatus of FIG. 8 to an enlarged scale.

To integrate the pleated fabric bag 31 with the plastics end cap 32 there is employed a moulding device generally indicated at 56 (see FIGS. 8 and 9). This moulding device comprises a baseplate 57 on which is mounted a former 58, preferably formed of plastics material (a polyurethane), which conforms to the internal pleated configuration of the stitched pleated filter bag 31. The height or depth of the former 58 is the required thickness of the end cap 32 or substantially so.

Extending upwardly from the former 58 are a multiplicity of vertical plates 59 welded to a connecting plate 59A, each aligned with a finger 60 of the former 58, adjacent fingers 60 defining a pleat. The assembly of plates 59, 59A are releasably supported by vertical pillars 61, say by nuts 59B screw-engaging the latter, moulded into, or releasably socketted into the former 58. The plate assembly 59, 59A terminates at one end in a ridge configuration 62 and at the other end in a relatively flat configuration 63 constituted by one of the plates 59.

To ensure that the pleated filter bag 31 makes intimate contact with the former 58 there is provided a pair of external clamping bars 65, one for each pleated side wall 53, but only one shown, with pleating fingers 66 adapted for releasable securement in any convenient manner around the pleated fabric bag 31 with the fingers 66 disposed fully within the pleats thereby assisting the intimate contact between the pleated filter bag 31 and the former 58. The clamping bars 65 can be releasably secured together by clipping or bolting for example, or they may simply be a push fit. They can be hinged or pivoted together at one end, or they may, of course, be omitted. If provided, handles 65A are provided to facilitate fitment and removal to the plates 59 with the pleated filter bag 31 intervening.

The moulding space for the end cap 32 is defined by the baseplate 57 and four walls or bars, two end walls 67 and two side walls 68, which are provided with spigots 69 engageable in holes or sockets 70 in the baseplate 57. Each bar or wall 67 or 68 has handles 71 to facilitate its disposition on and removal from the baseplate 57. The bars or walls 67, 68 define a rectangular frame around the former 58.

With the rectangular frame 67, 68 in position around the former 58 and the pleated fabric bag 31 fitted open end downwards as aforesaid, fluent plastics material, for example polyurethane, of the desired characteristics is poured into the moulding space to the required depth, i.e. the depth of the former 58 or slightly less. As is common in moulding a release agent is applied to those surfaces from which the pleated filter bag 31 and end cap 32 must detach at the end of the moulding process, for example the baseplate 57 and former 58.

The bars or walls 67 and 68 may be the same or greater height than the height of the former 58.

The plastics material is allowed to set or cure and then the bars or walls 67, 68 are removed, as are the clamping bars 65, 66 if provided, and the pleated filter bag 31 with integral end cap 32 is removed ready for use.

The pleated filter bag 31 may be presented, open end downwards, to its mould 57 to 68 suspended from a hanger (not shown) to facilitate its fitment onto the mould 57 to 68.

Figure 10:
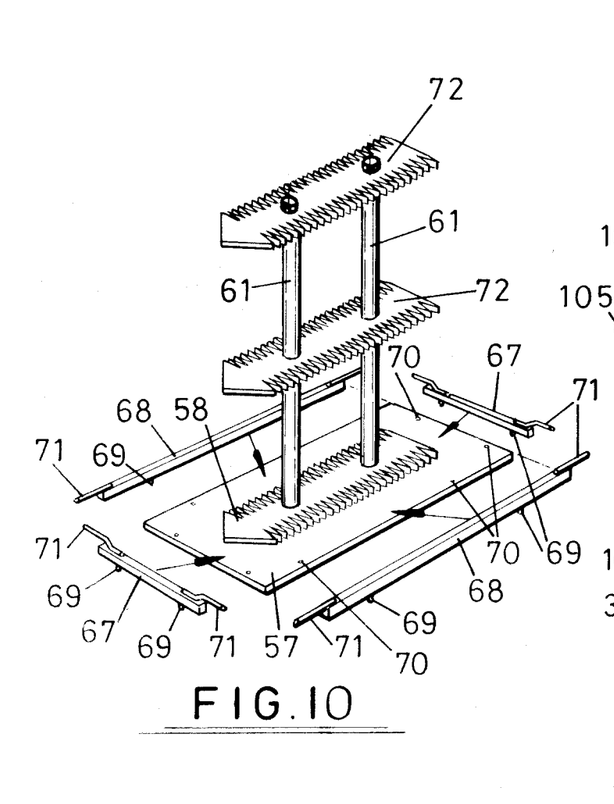
FIG. 10 is a view of a modified moulding apparatus for forming pleated filter bags according to the present invention.

Instead of the vertical plates there may be secured to the pillars 61 other formers 72 (see FIG. 10) corresponding in configuration to the former 58. While only two are shown more than two would normally be employed spaced closely together.

Figures 1, 1A, 1B, 6, 6A, 7:
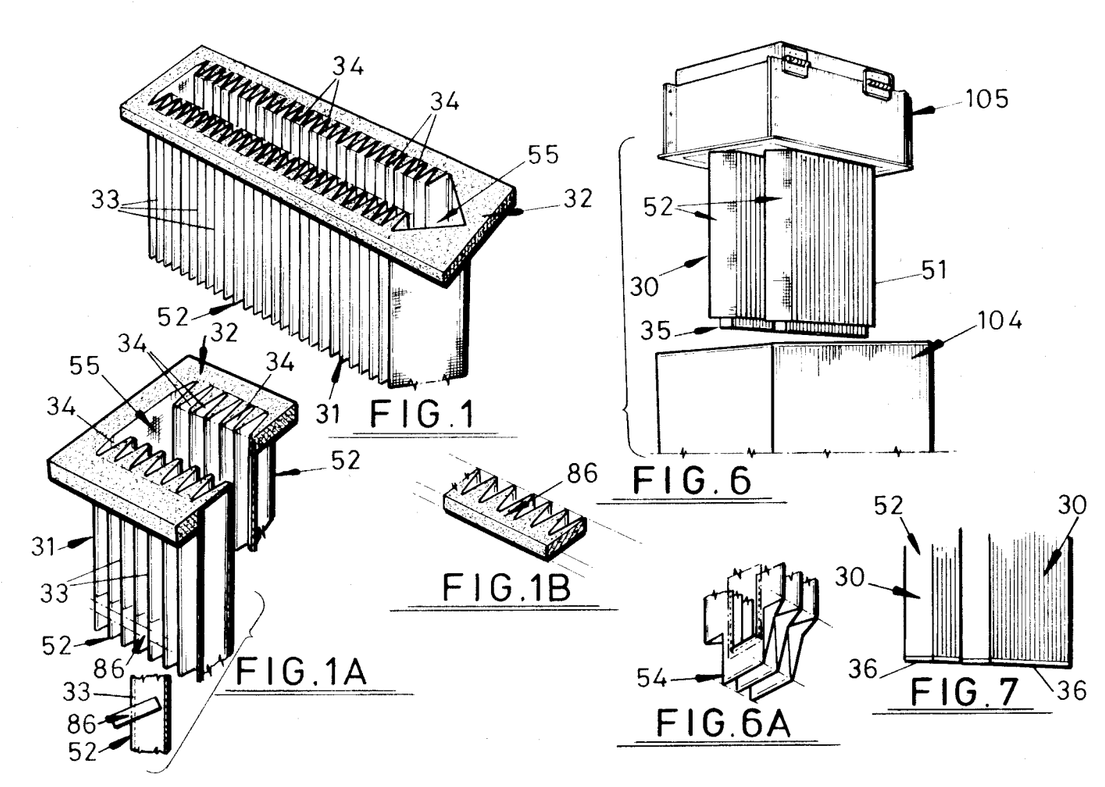
FIG. 1 is a fragmentary perspective view of a pleated filter bag according to the present invention.
FIG. 1A is a fragmentary detail view of FIG. 1 to an enlarged scale.
FIG. 1B is a detail fragmentary perspective view of a form of external reinforcement which can be applied to a pleated filter bag according to the present invention.
FIG. 6 is a perspective view of an assembly of stitch formed pleated bag filters mounted in a clean air plenum for fitment to the casing of a filtering apparatus.
FIG. 6A is a fragmentary detail perspective view of the closed end of a stitch formed pleated filter bag.
FIG. 7 is a perspective detail view of the closed end of a pleated filter bag according to the present invention illustrating an alternative mode of closing the bag at one end.

If the pleated filter bag 31 is to have the imperforate plastics end cap 36 then a second moulding operation is necessary. This will normally follow the moulding of the end cap 32 and, in this instance, former 58 will be omitted, fluent plastics material being supplied to the moulding space both externally and internally of the pleated filter bag 31. If necessary, one or more removable pleating bars 65, 66 can be used to assist correctly disposing and holding of the pleats which will, of course, already be locked by the integral end cap 32.

The inner and outer sections of the end cap 32 may, of course, be moulded simultaneously and, in this instance, the pleated filter bag 31 will be secured in pleated position with internal pleating plates or formers and external pleating fingers disposed clear of the moulding space.

Reference has hitherto been made to pleated fabric filters of substantially rectangular configuration (cross-section) but it will be manifest to those skilled in the art that other cross-sectional shapes can readily be employed such, for example, as triangular, cylindrical or polygonal. The cross-sectional shape may be uniform or tapering.

Reference has also hitherto been made to fabric but it again will be manifest to those skilled in the art that other filter media, such, for example, as felt, plastics material and paper may be employed, or combinations thereof.

The pleating of the fabric (for convenience reference herein and in the claims will continue to be made to "fabric") may be effected in any convenient manner, for example by using a conventional pleating machine or by any other pleating methods known to those killed in the art of pleating fabric.

The pleats can be defined by laying strips of rigid plastics material on the fabric and bonding, welding or otherwise integrating the strips to the fabric along the pleat lines. Such strips may be triangular in cross-section to define sharp angled pleats.

A pleated filter bag 31, 32 as described above has a removable internal supporting cage 73 to complete the pleated fabric filter 30 (see FIGS. 12 to 13 and 17 and 17A).

This cage 73 (see FIGS. 12 to 13 in particular), is formed in two sections of wire rod tack welded together but could, for example be, inter alia, a rigid plastics cage. The cage 73 has a central opening 74 from which outwardly extends a multiplicity of rods 75, one for each pleat of the pleated filter bag 31, 32.

Figures 11, 12:
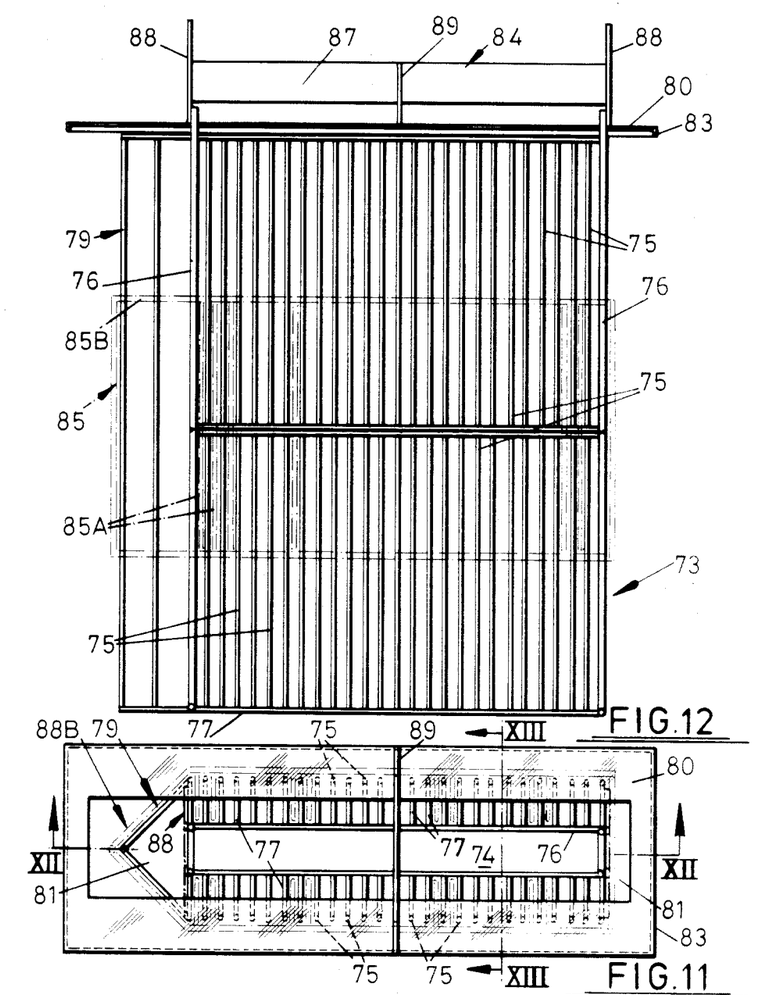
FIG. 11 is a plan view of an internal rigid reinforcement suitable for use with the pleated filter bag according to FIGS. 1 to 1B.
FIG. 12 is a sectional view on the line 12—12 of FIG. 11.
Figures 13, 14:
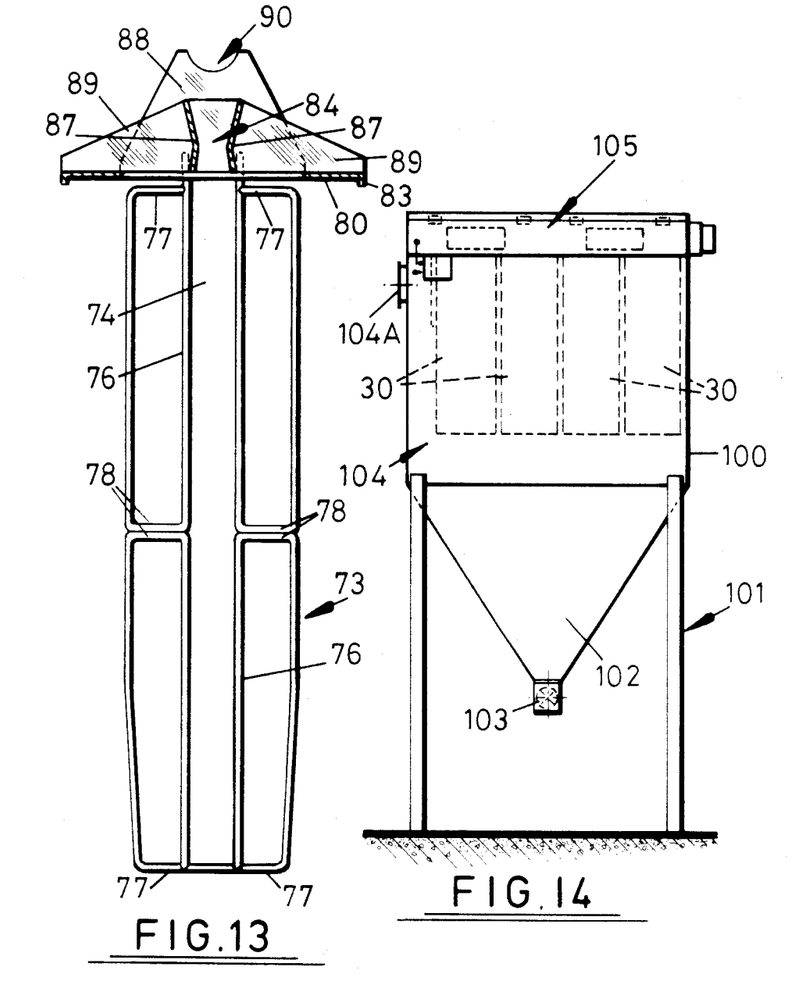
FIG. 13 is a sectional view on the line 13—13 of FIG. 11.
FIG. 14 is a diagrammatic view of a simple filtering apparatus incorporating pleated fabric filters according to the present invention.

More specifically, for the abovedescribed pleated filter bag 31, 32, and assuming the open end of the latter is at the top, the supporting cage 73 comprises a central wire core 76 defining the central rectangular opening 74.

From this central wire core 76 extend the rods 75 connected to the latter by bent ends 77, the sections being tack welded together at 78. Also at one end, there is a ridge configuration 79 of wire rod.

The cage 73 is, therefore, as can readily be seen of openwork configuration with a rod 75 extending into each pleat of the pleated filter bag 31, 32 and the ridge configuration 79 into the ridge end wall 48 of the pleated filter bag 31, 32.

The cage 73 can alternatively be formed of wire mesh material folded into a pleated configuration.

The cage 73 is connected to a top plate 80 for use in mounting the pleated bag filter 30 in a filtering apparatus. The top plate 80 has a rectangular opening 81. The top plate 80 is dimensioned to sit on the end cap 32 and is flanged as indicated at 83 to abut the peripheral wall of the latter.

The top plate 80, in this embodiment, has an upper (i.e. cage-remote side) elongate nozzle or duct 84 which will be described later.

The cage 73 is of welded or formed construction.

It is sometimes necessary or desirable to provide the pleated filter bag 31 with an external support additional to the support provided by the internal supporting cage 73. For example where the pleated filter bag is of substantial length. This can be achieved by an external supporting cage 85 of a height less than that of the filter bag 31 (see FIG. 12). Such cage 85 may simply comprise two separate push-fit cage elements, one for each pleated bag side, or the cage elements may be hinged together and secured around the filter bag 31 at the free end by bolting or clipping.

The external cage 85, of whatever construction, has rods or other portions 85A which are disposed within the filter bag pleats and an end ridge formation 85B for location around the ridged end of the pleated filter bag 31.

An alternative form of external support is achieved by moulding to the exterior of the pleated filter bag one or more (spaced if more than one) plastics (polyurethane for example) strips 86 (see FIGS. 1A and 1B). Such strip or strips 86 form an integral part of the pleated filter bag 31. These strips 86 are inclined or canted downwardly as shown to ensure that particulate material does not lie thereon in contact with the pleated filter bag.

Referring again to the elongate nozzle or duct 84 welded to the top plate 80, this is of converging cross-section, i.e. it converges towards the top plate 80.

It is defined by two side walls 87 and two end walls 88, and a central division wall 89 connected to the top wall 80 to act as a stiffener.

The cross-sectional area of the duct 84 is less than that of the opening 81 in the top plate 80.

Each end wall 88 of the nozzle 84 has a semicircular recess 90 formed in the upper end.

This nozzle 84 permits a particular mode of securement of a pleated bag filter 30 within a filtering apparatus as will be described later.

Filtering apparatus, as is well known to those skilled in the art, can be of widely varying construction and dimensions depending upon the duty to be performed by a particular filtering apparatus. Also the number and arrangement of filters in a filtering apparatus is again determined by the duty to be performed by the particular apparatus.

In general terms however a filtering apparatus comprises "a dirty air section" and "a clean air section", which sections are separated by a cell plate having openings therein with a filter being disposed in each opening of the cell plate. The filters, of whatever construction, allow the passage of air from "the dirty air section" into "the clean air section" the dirt, dust and other undesirable material carried by the air in "the dirty air section" being caught and held on the filter with the air passing through the porous filtering medium of the filter into "the clean air section" from whence it is diverted to atmosphere or back into an air circulating system if desired. To allow such separation to occur each filter, as is well known to those skilled in the art, comprises a closed configuration extending into or presented to "the dirty air section", the filter being open at "the clean air section" of the filtering apparatus. Such filters are normally filter bags or filter pads or cartridge filters, the former two having an internal wire reinforcement or cage and the latter being a completely disposable unit, i.e. the filtering medium and its supporting reinforcement or cage (internal and/or external) is disposed of when the filter becomes non-usable after a period of time. This is expensive and uneconomic. As regards filter bags and filter pads they also require to be replaced after a period of time since they become non-functional and as is well known to those skilled in the art with known filter bags or filter pads it is necessary to partially dismantle a filtering apparatus to remove existing filter bags or pads and replace them with fresh filter bags or pads.

A pleated bag filter according to the present invention can be employed instead of a conventional filter bag, filter pad or cartridge filter and is easily and readily fitted in position in a filtering apparatus and is also easily replaceable. This ease of fitment and replacement is facilitated by the integral end cap 32 of the pleated bag filter 30.

The pleated bag filter according to the present invention may be secured to its cell plate by simple bolting through the end cap into the cell plate structure with or without the intervention of a protective metal cover plate or it may be fastened to the cell plate by clips or clamps engaging the end cap to hold the latter against the cell plate with or without a protective metal cover plate. Generally speaking however a metal cover plate will form an integral part of the internal supporting cage (see for example top plate 80) but it is to be clearly understood that the internal supporting cage need not have such a plate and may simply be constituted by a wire framework as disclosed and described with reference to FIGS. 11 to 13 minus the top plate 80 and nozzle 84. It will also be manifest that the internal supporting cage, whether wire or plastics, will conform to the cross-sectional configuration of the pleated filter bag.

The preferred rectangular pleated fabric filter compared with conventional bag filters or cartridge filters gives for a given volume of filtering apparatus casing or housing a substantially greater filter fabric area thus providing an up-rated air cleaning facility.

It is also known, to those skilled in the art, that with such filtering apparatus it is necessary to provide a means for cleaning the filter bags, pads or cartridges, i.e. a means to dislodge the dirt, dust and other material collected thereon from time to time in order to extend the operational life of the filters. If such cleaning operation is not effected then the filters quickly become clogged and nonfunctional.

The three main methods employed are mechanical shaking or vibration which is used in relation to filter bags and filter pads but not filter cartridges, back-washing by a reverse air flow, i.e. a flow counter to the flow of air passing from "the dirty air section" of the filtering apparatus into "the clean air section" or by pulse jet cleaning, i.e. by periodically introducing a jet of relatively high pressure air for example between 25 to 100 psi, into the interior of the filter pneumatically to vibrate or shake it to assist the removal or freeing of the particulate dirt, dust or other material adhering to the filter surface. These two latter methods of cleaning can be employed with all three kinds of filters.

All three forms of filter cleaning can be employed with the pleated bag filters according to the present invention but it is preferred to employ pulse jet cleaning and it is for this reason that the nozzle 84 is provided.

Reference is now made to FIGS. 14 to 18.

A filtering apparatus comprises a casing or housing 100 supported above ground level by a leg structure 101 and having a bottom dust collection and removal hopper 102, such removal being via a valve 103 at the bottom end of the hopper 102.

Figures 17, 17A:
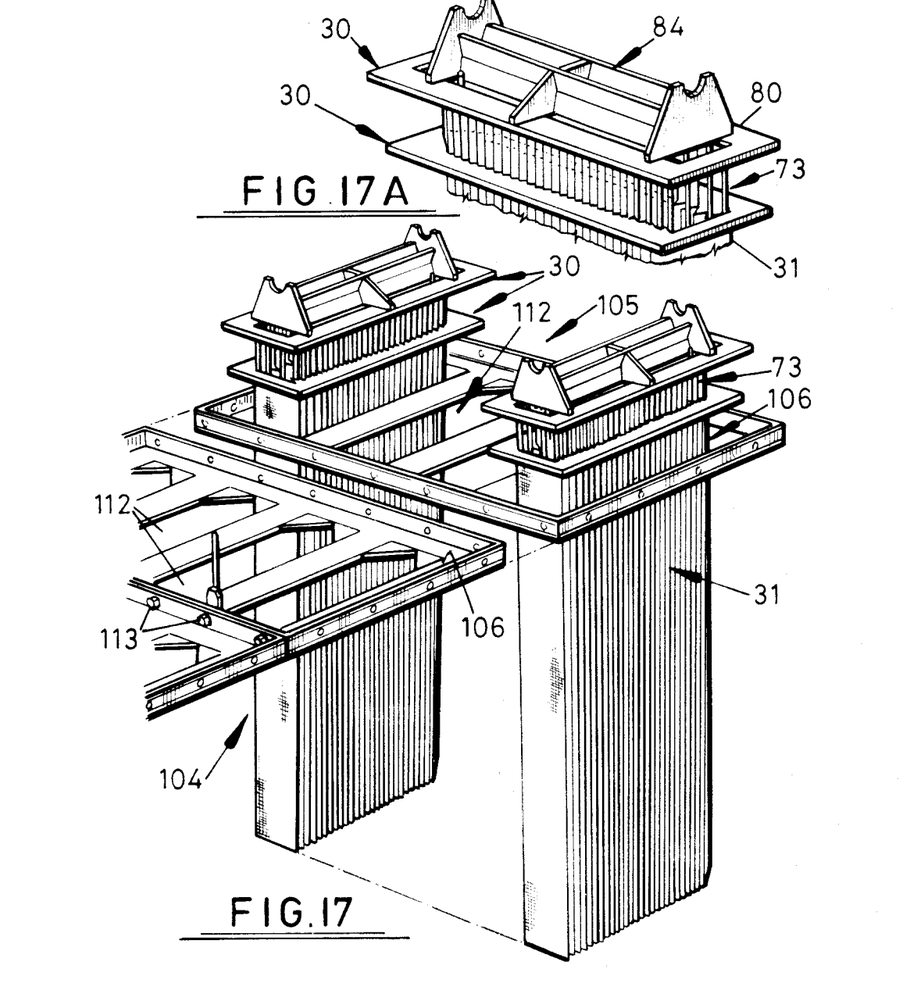
FIG. 17 is an exploded perspective view of the cell plates and pleated bag filters according to the present invention.
FIG. 17A is a fragmentary perspective view, to an enlarged scale, of a pleated bag filter according to the present invention as illustrated in FIG. 17.

The casing or housing 100 has a "dirty" air section 104 with an inlet 104A for the air carrying dirt, dust, fines and other particulate to be removed or filtered out and a "clean" air section or plenum 105 separated from the section 104 by a cell plate 106 (see FIG. 17).

Figure 15:
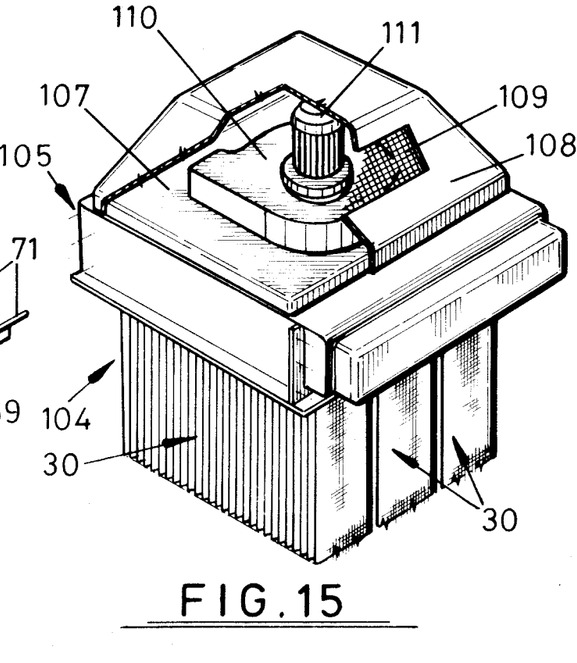
FIG. 15 is a diagrammatic perspective view of the upper part of the filtering apparatus according to FIG. 14 illustrating additional components of the filtering apparatus.

In this instance the "clean" air plenum 105 has a top door 107 which is covered by a removable acoustic enclosure 108 having a "clean" air outlet 109. On the top door 107 is a fan and motor assembly 110, 111 for drawing the "dirty" air into the housing 100 and from the "dirty" air section 104 into the "clean" air section or plenum 105. Such passage of air is, of course, through the pleated bag filters 30 mounted in the cell plate 106.

The latter as can be readily seen in FIG. 17 has openings 112 for receiving and mounting the pleated bag filters 30, which openings 112 correspond in shape to the filters 30.

In FIG. 17 there is shown three cell plates 106, each for mounting four pleated bag filters 30, the cell plates being bolted together as indicated at 113. It will be manifest to those skilled in the art that the area of cell plate employed to support filtering fabric is substantially greater than is the case with known conventional filtering apparatus. This is due to the rectangular configuration of the pleated bag filters.

It is to be understood that the abovedescribed filtering apparatus is merely an example to illustrate the general well-known arrangement of such apparatus. It is in no way limitative but merely illustrates the use of the pleated bag filters of the present invention in industrial filtering apparatus generally.

As aforesaid, the pleated bag filters 30 according to the present invention are preferably but not exclusively employed with a pulse jet cleaning arrangement which additionally serves releasably to secure the pleated bag filters 30 in position in their cell plates 106. This combined filter bag cleaning and securing arrangement is the subject of our United Kingdom Patent Application No. 85 04267 filed 19th Feb. 1985 and can be employed with filter bags or filter pads other than those of the present invention, i.e. non-pleated filter bags or pads. This arrangement is the subject of application for separate Patent protection.

Reverting to the nozzle 84 it will be seen most clearly in FIG. 13 that it defines a Venturi which is a requirement of pulse jet cleaning.

Figures 16, 19:
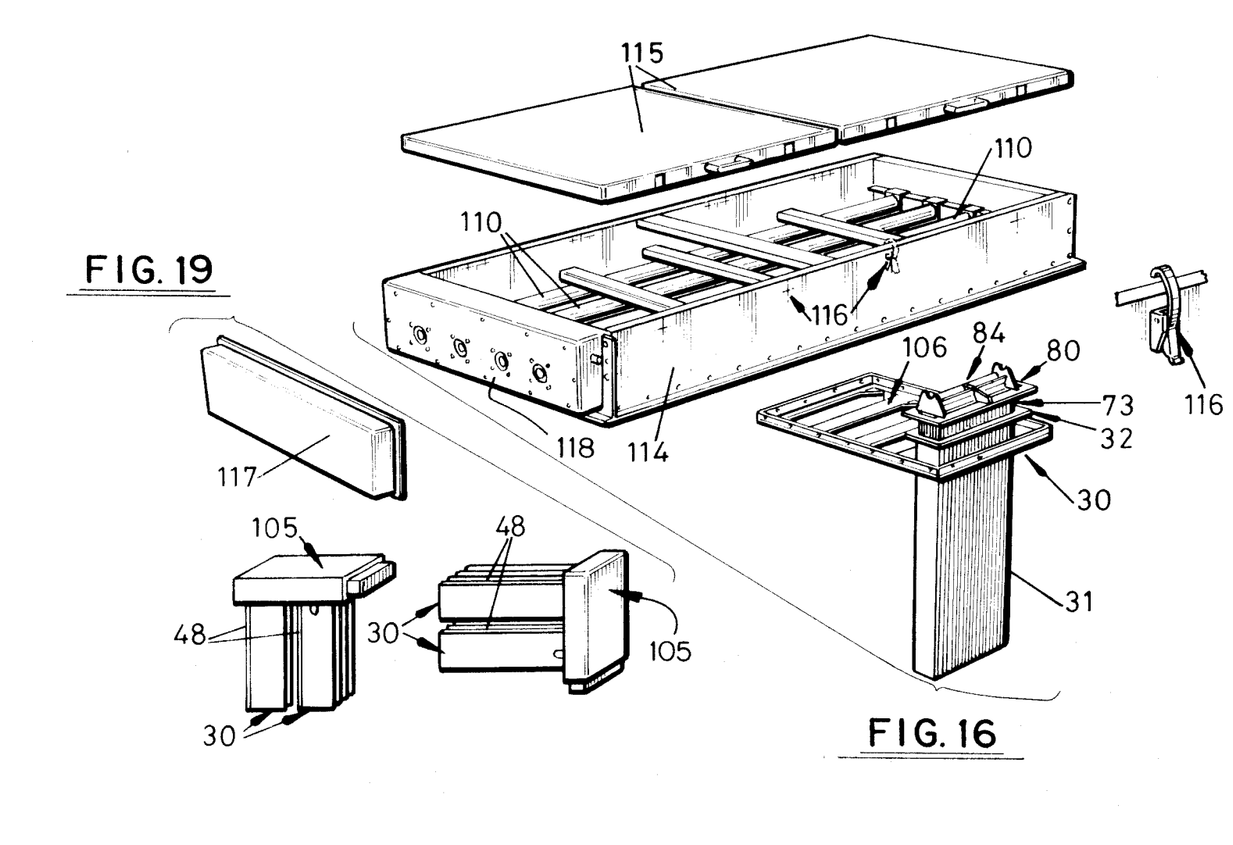
FIG. 16 is an exploded perspective view of the clean air plenum of the filtering apparatus according to FIGS. 14 and 15.
FIG. 19 shows two modes of assembly of the pleated bag filters according to the present invention.

In FIG. 16, an example of a "clean" air plenum 105 is shown in exploded view and comprises a rectangular wall structure 114, two top doors 115 in this instance secured to the wall structure 114 by clamps 116, a compressed air tank 117 and associated air valve assembly 118 at one end of the wall structure 114 controllably serve to deliver compressed air periodically to pulse jet tubes 119 between the end walls of the wall structure 114.

Figures 18, 18A:
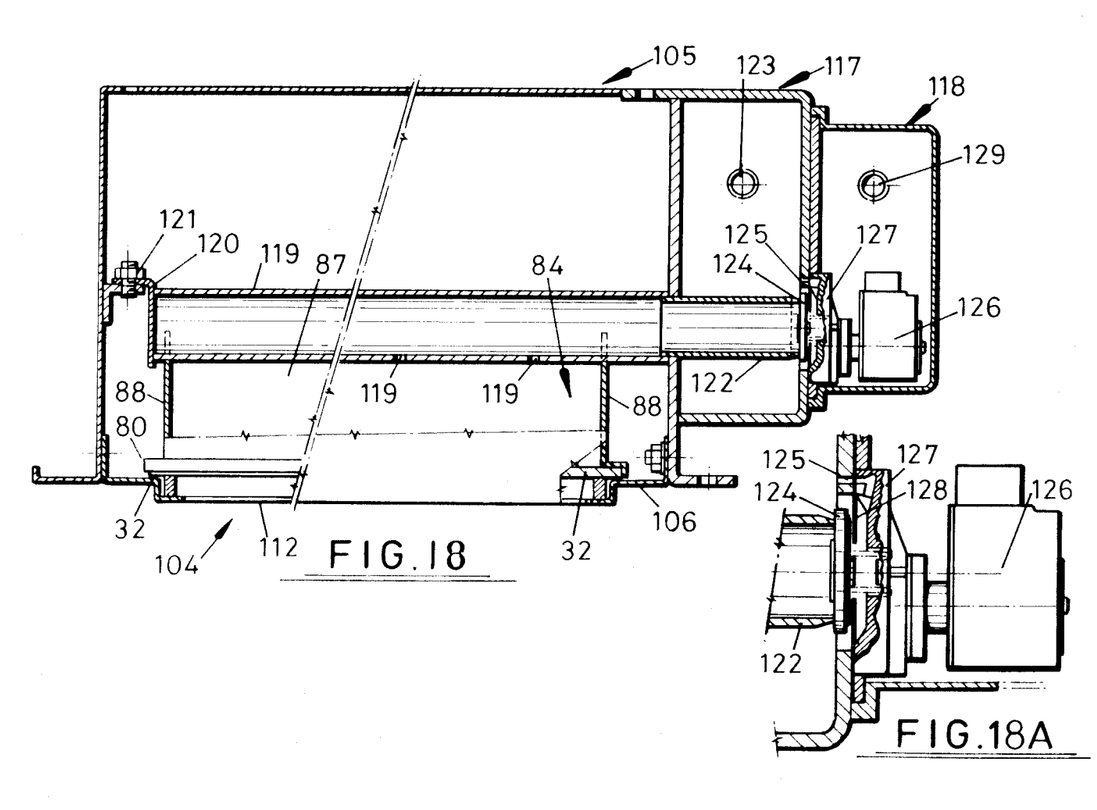
FIG. 18 is a sectional view through the clean air plenum of the filtering apparatus of FIGS. 14 and 15.
FIG. 18A is a detail view to an enlarged scale of the valve controlled air inlet to a pulse jet cleaning system for use with the pleated bag filters according to the present invention.

Referring now to FIG. 18, it can be seen that each pulse jet tube 118 is formed with bottom air outlet holes 119 (or slits or slots). Each pulse jet tube 118 sits on the end plates 88 of the Venturi nozzle 84 within the semicircular recesses 90, and one pulse jet tube 119 can, it will be manifest, can sit on two or more aligned pleated bag filter Venturi nozzles 84. Each pulse jet tube 119 is squared off at one end by an angle plate 119 which is secured to a bracket 120 by a bolting arrangement 121. The other end of the pulse jet tube 119 plugs or sockets onto a tube 122 disposed with the compressed air tank or header 117. The tube 122 projects into the "clean" air plenum 105 as shown to receive the pulse jet tube 119 and is open at its other end within the tank or header 117. A compressed air inlet 123 is provided at one end of the latter continuously to deliver compressed air to same from a compressed air supply (not shown).

The pulse jet tube 119 therefore provides a simple effective means for securing the pleated bag filter 30 onto the cell plate 116. To replace a nonfunctioning pleated filter bag 31, 32 all that is necessary is to open the appropriate "clean" plenum chamber door 115, release the bolt fastening 121 from the appropriate pulse jet tube 119, remove the latter from its locating tube or pipe 122, remove the pleated bag filter 30, discard the pleated filter bag 31, 32, refit a fresh pleated filter bag 31, 32 onto the internal reinforcement 73, relocate the pleated bag filter 30 into its cell, plug or socket the pulse jet tube 119 onto its respective locating tube or pipe 122 and fasten the bolting arrangement 121. The door or cover 115 can then be refastened and the filtering apparatus is ready for use once again.

From this it will be manifest that there is provided a simple but effective means for clamping the pleated bag filters 30 in position without a multiplicity of securing means requiring individual release as is common with existing bag or pad filters. In this case only one bolt needs to be undone and the pulse jet tube 119 removed.

Compressed air is normally prevented from entering the tube or pipe 122 and consequently the pulse jet tube 119 by means of a diaphragm valve 124. A bleed passage 125 connects the compressed air tank or header 117 with the back of the diaphragm valve 124 so that the latter is held closed by compressed air.

A solenoid valve 126 is mounted on an enclosure 127 which clamps the diaphragm onto the wall of the compressed air tank or header 117 and which with the diaphragm valve 124 defines a chamber 124 with which the bleed passage 125 communicates. Operation of the solenoid valve causes venting of the compressed air from this chamber into the valve housing and out through outlet 129 to atmosphere and simultaneously the diaphragm valve 125 is moved away from the end of the tube or pipe 122 allowing a pulse of compressed air to pass therealong into the pulse jet tube 119 and from there down into the pleated bag filter or filters 30 to vibrate or shake same for cleaning purposes. The solenoid valve 126 then operates to cut off the venting and the diaphragm valve is loaded by compressed air into a position where in closes the tube or pipe 122.

Operation of the solenoid valve or valves is effected periodically by solid state circuitry. The control of these solenoid valves is not described in detail since pulse jet cleaning in the field of industrial filtering apparatus is well known to those skilled in the art and consequently it is not considered necessary to describe such system in detail.

FIG. 19 illustrates how the pleated bag filters 30 can be disposed either vertically as has been described above or horizontally. In the latter case, the ridge formations 48 are at the top. The pleated bag filters according to this invention provides this hitherto unknown facility of horizontal disposition and more significantly vertical stacking of horizontally disposed filters which allows the filter fabric area within a given filter casing size to be substantially increased. Only two horizontally disposed, vertically spaced pleated bag filters are shown. There could be more, say a stack four high for example, or even more.

Figure 20:
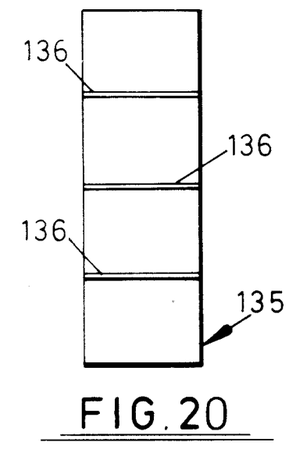
FIG. 20 is a plan view showing an alternative method of forming a pleated filter bag.
Figure 20A:
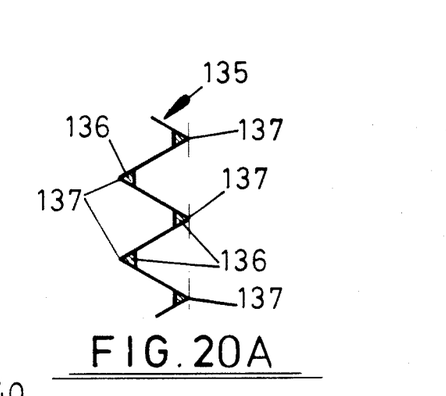
FIG. 20A is a view corresponding to FIG. 20 showing the filtering fabric in pleated condition.

FIGS. 20 and 20A show an alternative method of pleating. Here a layer 135 of filtering fabric is laid flat with relatively rigid plastics strips 136 laid in parallel array thereon to define apices 137 in the pleated condition. The fabric 135 and strips 136 are integrated by any convenient means, for example adhesive bonding, welding or stitching.

Figures 21, 21A, 21B, 21C:
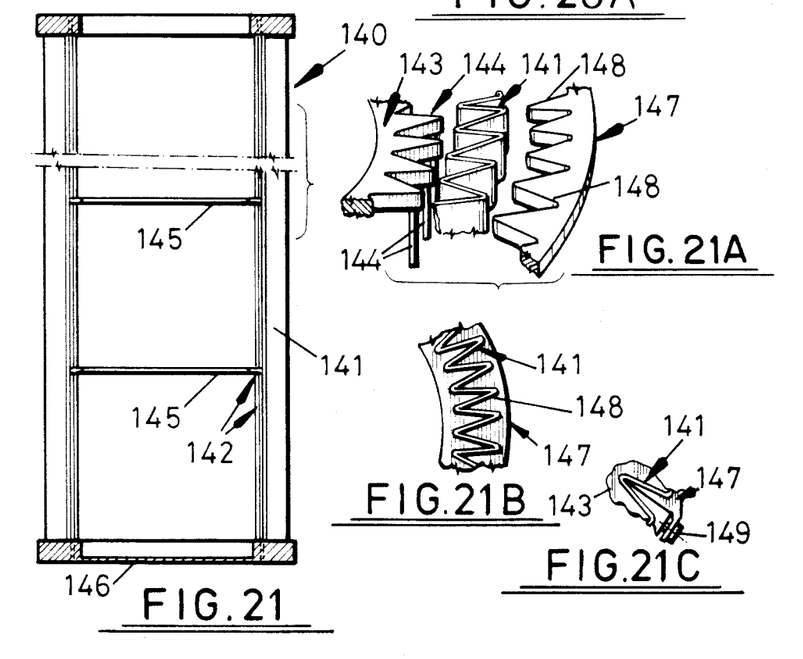
FIG. 21 is a longitudinal sectional view of an alternative form of pleated bag filter according to the present invention.
FIG. 21A is a perspective fragmentary detail view of the open end of the pleated bag filter of FIG. 21.
FIG. 21B is a fragmentary plan view of the open end of the pleated bag filter of FIG. 21.
FIG. 21C is a detail view of the open end of the pleated filter bag of FIG. 21 illustrating one method of securing the pleated filter bag in position.

Reference is now made to FIGS. 21 to 21C which show an alternative form of pleated bag filter 140 of circular form or cross-section but here again it is to be understood that other cross-sections are possible.

In this instance the pre-pleated filter bag is designated 141. The internal supporting cage 142 comprises a moulded plastics annulus 143 of externally toothed configuration as indicated at 144 complementary to the pleating of the filter bag 141. This annulus 143 defines the open end of the pleated filter bag 141. The cage 142 also comprises a series of annularly-spaced rods 144 of wire or plastics preferably but not essentially connected by wire or plastics rings 145. These rods 144 connect the annulus 143 to a moulded plastics disc 146 having an externally toothed configuration and dimensions identical to the annulus 143. This disc 146 defines the closed end of the pleated fabric filter 140.

With the tubular filter bag 141 disposed around the internal reinforcing cage 142 constituted by annulus 143, rods 144, 145 and disc 146 it is necessary to secure the two components together and this is effected by outer moulded plastics split rings or segments 147 having internally toothed configurations 148 complementary to the external toothed configurations 144. The split rings or segments 147 are secured by one or more releasable clips or other fasteners 149 to clamp and lock the filter bag or tube 141 in position around the internal reinforcing cage 142.

The filter bag 141 may be self closing at one end and in this instance the disc 146 and its respective outer ring or segments 147 may be omitted, the internal reinforcing cage terminating in a ring at said closed end.

The end closure of the pleated filter bag may be by the pleated filter fabric itself.

Particular advantages accruing from the use of pleated fabric rectangular filters of the present invention compared with known bag filters are:

(1) A larger amount of filter area in a given filter casing space.
(2) Better air flow characteristics because of its "slim" design.
(3) Better cleaning aspects because of its opening-/length ratio.
(4) High efficiency filtration.
(5) Easy access for removal of the cartridge.
(6) A versatile filter capable of handling large or small volumes with different options of cartridge layout to suit most applications and restrictive sites.
(7) The facility of being used in individual module form or being built up into large units or assemblies.

With cartridge filters for which the pleated fabric rectangular filter can readily be substituted the main advantage is that when the operational life is completed only the pleated bag is disposed of not the entire filter as is the case with cartridge filters.

What is claimed is:

1. A filter comprising a pre-pleated fabric filter bag having an open end and a closed end and side walls formed of adjacent pleats extending between said open end and closed end,
    an apertured plastics end cap integrally moulded with the open end of the filter bag, said end cap having an internal configuration of side-by-side grooves each of which receives a pleat of the filter bag, and
    an internal reinforcing cage detachably located within the filter bag, said cage extending into each of the pleats of the filter bag and corresponding portions of the end cap.

2. A filter as claimed in claim 1, in which the filter bag and end cap are of generally rectangular cross-section.

3. A filter as claimed in claim 1, in which the pre-pleated filtering fabric is formed from a plurality of strips having a length more than twice the depth of the filter bag to be formed and a width equal to one wall of a pleat, the pleats being arranged in a vertically spaced horizontal array and the filtering fabric being subjected to a cutting action to remove spaced but adjacent sections therefrom to provide two hinge or pivot locations whereby the strip portions outboard of these locations are swung through 90° to form the pleated side walls of a rectangular filter bag, the cut edges being stitched closed and the middle portion of the pleated fabric including said edges constituting the closed end of the rectangular filter bag.

4. A filter as claimed in claim 3, in which the cutting action serves to split the filter fabric to provide the hinge or pivot locations.

5. A filter as claimed in claim 3, in which the side wall portions of the rectangular filter bag are joined by end walls which are stitched thereto.

6. A filter as claimed in claim 5, in which at least one of the end walls in plan view is of triangular shape.

7. A filter as claimed in claim 1, in which the pre-pleated fabric filter bag is sealed at its closed end by a moulded plastics imperforate end cap.

8. A filter as claimed in claim 1, in which the moulded apertured plastics end cap comprises an internal annulus having an externally toothed periphery and an external annulus with an internally toothed periphery adapted to be secured around the internal annulus to clamp the pleated fabric filter bag therebetween.

9. A filter as claimed in claim 1, in which one end of the internal cage is secured to an apertured cover plate, said cover plate being dimensioned to lie over and abut against the moulded apertured plastics end cap of the filter bag.

10. A filter as claimed in claim 9, in which the cover plate has secured to its side remote from the cage and directed into the aperture of the cover plate an elongate Venturi nozzle.

11. A filter as claimed in claim 10, in which the Venturi nozzle includes a seating means formed at each of its two opposed end walls to receive and locate an air delivery tube of a pulse jet cleaning system.

12. A filter as claimed in claim 8, further comprising a moulded plastics disc having an externally toothed peripheral configuration corresponding to the configuration of the internal annulus, said disc defining the closed end of the fabric filter bag, a plurality of angularly spaced rods or strips extending from the internal annulus to the disc, said internal annulus, said rods and said disc defining the internal cage structure for the filter bag, and an outer annulus having an internally toothed peripheral configuration adapted to be secured around said moulded plastics disc to clamp the filter bag to said cage structure.

13. A filter as claimed in claim 12, in which the outer annulae are of split configuration or consist of a plurality of arcuate parts, releasable fastener means being provided to secure the outer annulae around the inner annulus and the moulded plastics disc.

14. A filter apparatus comprising a casing separated by a cell plate into a "dirty" air section and a "clean" air section or plenum, a plurality of filters formed from a fabric filter bag closed at one end and having at its other and open end a moulded aperture plastics end cap and an internal reinforcing cage disposed therein secured to an apertured cover plate abutting against the apertured plastics end cap, said cover plate having secured thereto an elongate Venturi nozzle, said filters mounted in the cell plate and extending through a cell thereof, and a pulse jet cleaning system comprising pulse jet air delivery tubes adapted to engage on the elongate Venturi nozzles of the internal reinforcement cage of each filter to secure the filter in position on the cell plate.

15. A filtering apparatus as claimed in claim 14, in which the or each pulse jet air delivery tube is secured in clamping position in contact with the elongate Venturi nozzle by a bolting arrangement at one end and by being push-fitted onto an end of an outlet pipe of the air delivery system of the pulse jet cleaning system.

16. A filtering apparatus as claimed in claim 15, in which the other end of the outlet pipe is located in compressed air supply tank or header and is normally closed by a solenoid operated valve, periodic energisation of the solenoid opening the valve to permit a pulse of air to be delivered to the pulse jet air delivery tube and from there down into the filter.

17. A method of forming a pre-pleated fabric filter bag having an open end, a closed end and a moulded apertured plastics end cap, comprising the steps of disposing the open end of the pleated filter bag in a mould around an internal former having a peripheral configuration of projections corresponding to the pleats of the filter bag, which former is surrounded by a wall defining the external configuration of the end cap of the filter bag, introducing between the wall and the former a fluent plastics material to make contact with the open end of the pleated filter bag, allowing the fluent plastics material to set and thereafter removing the pleated filter bag with its integral end cap from the mould.

18. A method as claimed in claim 17, comprising the step of externally securing the pleated filter bag to ensure that the pleats are held in regular and uniform array.

19. A method as claimed in claim 17, in which the plastics material is a polyurethane.

20. Apparatus for forming a pleated fabric filter bag having an integral apertured plastics end cap comprising a mold having a bottom wall, a former defining a pleated configuration around which the open end of a pleated fabric filter bag is disposed, a wall surrounding the former to define the outer periphery of the mold and thereby the end cap, and means for delivering fluent plastics material into the space between the former and wall to form the end cap integral with the pleated fabric filter bag.

* * * * *